Patented Aug. 4, 1931

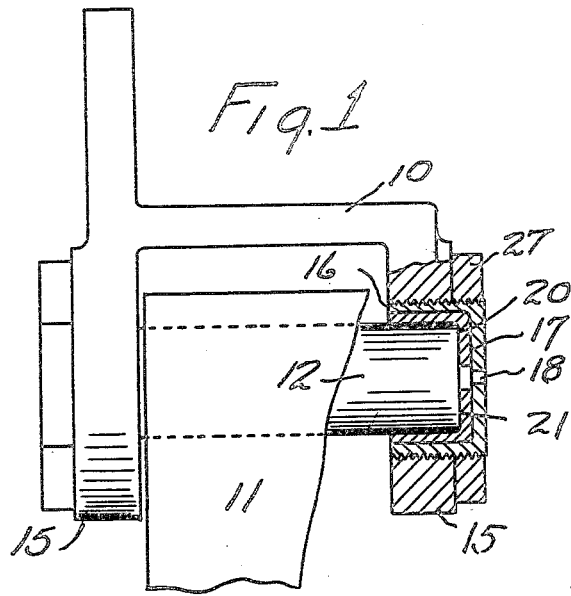
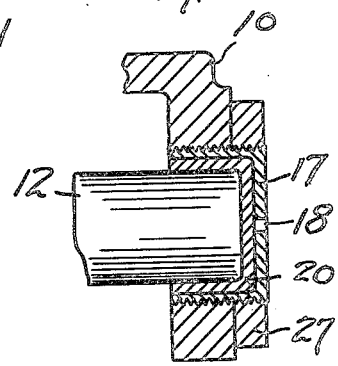
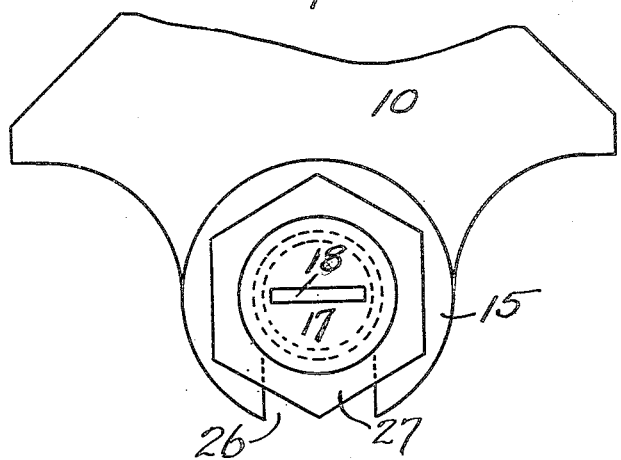
CARL CLAUS.
INVENTOR

1,817,892

UNITED STATES PATENT OFFICE

CARL CLAUS, OF PLAINFIELD, NEW JERSEY, ASSIGNOR TO BOUND BROOK OIL-LESS BEARING COMPANY, OF BOUND BROOK, NEW JERSEY, A COMPANY OF NEW JERSEY

SPRING SHACKLE

Application filed January 5, 1928. Serial No. 244,723.

This invention relates to spring shackles particularly to that class of shackles which are used in automotive construction through which the spring is secured to the chassis of an automobile or other vehicles and has for its object to provide a shackle that will eliminate shackle care and annoyance common to those now in use and to provide uniform free shackle action which permits better and more uniform operation of the springs and, therefore, better riding qualities of the car.

Lubrication of spring eye and shackle bushings is very difficult due to high pressure and slight oscillation at the point of contact which has made it impossible to interpose and maintain a satisfactory oil film. Dust and water enter the bushing, mix with the lubricant, clog up the oil passages, absorb the lubricant and act in many cases as abrasives. This state of affairs produces rapid deterioration of the pins, bushings and shackle plates, also unsatisfactory action of the springs and shock absorbers, squeaks, rattles and jerks are the result.

Among the further objects of this invention is to provide means for maintaining over long periods of suitable oil film at the point of contact, thereby eliminating wear and the necessity of frequent lubrication, and to provide convenient and economic means for connecting vehicle springs to vehicles.

The foregoing and other features of my invention will now be described in connection with the accompanying drawings in which I have illustrated my spring shackle in its preferred form, after which I shall point out in the claims those features which I believe to be new and of my own invention.

In the drawings

Figure 1 is a front elevation of my improved spring shackle showing a portion of same broken away to more clearly show its detailed construction.

Figure 2 is a side elevation of the same.

Figure 3 is a modification which I may employ.

In the drawings 10 indicates a portion of a vehicle frame and 11 indicates a conventional type of leaf spring for connecting the chassis to the frame.

In the form of the invention shown in Figure 1 the spring 11 is provided with an eye into which is press-fitted a cross pin 12.

In the vehicle frame 10 two horns or projections 15 are provided with aligned openings 16. These openings are screw threaded as indicated.

Cup shaped sockets 17 are provided with the outside diameter screw threaded to fit the screw threaded portion of the openings 16. A slot 18 or other means is provided to adjust the socket in its opening. Within these sockets 17 I provide a bushing 20 of porous material adapted to snugly fit the end of the pin 12 and to take the lateral thrust on its flat surface 21 which bears against the flat end of cross pin 12. These porous bushings are of the self-lubricating type and contain approximately 25% by volume more or less of lubricant.

In the horns or projections 15 passages 26 are cut away. These passages are wide enough to permit the pins to slip into position within the aligned openings 16 after which the sockets 17 are screwed home until the end 21 of the bushing is tight against the end of the cross pin 12.

A lock nut 27 or other means is provided to prevent movement of the sockets within the vehicle frame. It will thus be evident that the spring shackle pin is free to move within the self-lubricated bearing, that side thrust is taken up by the end of the pin and base of the cup shaped bushing, that no lubrication is necessary and consequently squeaks and rattles will be eliminated.

I distinctly wish it understood that my spring shackle herein illustrated and described is in the form in which I desire to construct it, but that changes or variations may be made as may be convenient or desirable without departing from the salient features of my invention and I therefore intend the following claims to cover such modification as naturally fall within the lines of invention.

I claim:

1. A spring shackle comprising a non-rotating vehicle frame having aligned bearing recesses therein spaced apart from each other, said frame having lateral passages therein communicating with the recesses, said bearing recesses screw threaded, screw threaded socket members adapted for lateral adjustment within the recesses, a slot cut through the end of the socket member, means to hold the sockets in adjusted position, cross pins adapted to pass through the lateral passages for alignment within the recesses, and porous cup shaped bushings interposed between the pins and the screw threaded sockets, said bushing completely covering the ends of the pins and filling the sockets.

2. In a spring shackle in combination with a frame and spring, bosses on the frame and spaced apart to admit the eye of the spring, a bearing pin secured in the spring eye and having uniform diameter throughout its length with ends projecting laterally beyond the sides of the spring, said bosses having recesses to receive said pin ends, the bosses being screw threaded to receive sockets, screw threaded sockets provided with self-lubricating bearings adapted to engage the ends of the pins and slots through the ends of the sockets.

In witness whereof I affix my signature.

CARL CLAUS.